United States Patent
Kim et al.

(10) Patent No.: US 7,715,872 B2
(45) Date of Patent: May 11, 2010

(54) VIDEO CALLING METHOD CAPABLE OF PROVIDING VIDEO THROUGH THIRD DISPLAY

(75) Inventors: Sun-Mi Kim, Seoul (KR); Young-Jip Kim, Suwon-si (KR); Young-Seop Han, Suwon-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 879 days.

(21) Appl. No.: 11/342,036

(22) Filed: Jan. 27, 2006

(65) Prior Publication Data

US 2006/0172766 A1    Aug. 3, 2006

(30) Foreign Application Priority Data

Feb. 3, 2005    (KR) .............. 10-2005-0010096

(51) Int. Cl.
- *H04M 1/19* (2006.01)
- *H04M 3/56* (2006.01)
- *H04M 3/54* (2006.01)
- *H04M 3/42* (2006.01)
- *H04L 12/18* (2006.01)
- *H04N 7/15* (2006.01)
- *G06F 15/16* (2006.01)

(52) U.S. Cl. ............... 455/553.1; 455/416; 455/417; 455/418; 370/260; 348/14.09; 709/204

(58) Field of Classification Search ............ 455/88, 455/417, 418, 421, 553.1; 370/262; 379/88.23, 379/102.02, 201.04; 348/14.09; 709/204

See application file for complete search history.

(56) References Cited

U.S. PATENT DOCUMENTS 6,714,233 B2 * 3/2004 Chihara et al. .......... 348/14.02
7,043,749 B1 * 5/2006 Davies .................... 725/120

(Continued)

FOREIGN PATENT DOCUMENTS

| JP | 2001-127847 | 5/2001 |
| JP | 2002-033743 | 1/2002 |
| JP | 2002-108752 | 4/2002 |
| JP | 2004-336602 | 11/2004 |

*Primary Examiner*—Dwayne Bost
*Assistant Examiner*—Michael Mapa
(74) *Attorney, Agent, or Firm*—Cha & Reiter, LLC

(57) ABSTRACT

Disclosed is a video calling method capable of providing video through a separate display over a VoIP network, which can transfer IP information of a specified display device to a mobile communication terminal, and provide video data transfer for a video call through the specified display device. According to the video calling method, a first mobile communication terminal connects a video calling service with a second mobile communication terminal, and receives a request to change a device for transmitting/receiving the video to/from the second mobile communication terminal to a separate display. The first mobile communication terminal transfers information about the display to the second mobile communication terminal, and controls the second mobile communication terminal to transmit/receive the video to/from the display. The first mobile communication terminal then transfers information about the second mobile communication terminal to the display, and controls the display to transmit/receive the video to/from the second mobile communication terminal.

17 Claims, 3 Drawing Sheets

U.S. PATENT DOCUMENTS

| | | | |
|---|---|---|---|
| 2004/0046783 A1* | 3/2004 | Montebovi | 345/730 |
| 2005/0207355 A1* | 9/2005 | Du | 370/260 |
| 2006/0040692 A1* | 2/2006 | Anttila et al. | 455/519 |
| 2006/0080407 A1* | 4/2006 | Rengaraju | 709/219 |
| 2006/0121924 A1* | 6/2006 | Rengaraju et al. | 455/518 |

* cited by examiner

VIDEO CALLING METHOD CAPABLE OF PROVIDING VIDEO THROUGH THIRD DISPLAY

CLAIM OF PRIORITY

This application claims the benefit of the earlier filing date of that patent application entitled "Video Calling Method Capable of Providing Video Through Third Display," filed in the Korean Intellectual Property Office on Feb. 3, 2005, and assigned Serial No. 2005-10096, the contents of which are hereby incorporated by reference

BACKGROUND OF THE INVENTION

1. Field of the Invention

The present invention relates to a video calling method for a mobile communication system, and more particularly to a video calling method that can provide video images of a video call, which are transmitted from a Voice over Internet Protocol (VoIP) network, through a third display device.

2. Description of the Related Art

VoIP is a technology that provides a voice service, which has been provided through a public switched telephone network (PSTN), by using an Internet protocol. By using an IP network, diverse services, which are not provided through the existing telephone network (PSTN), can be provided. Representative applications of such services may, for example, be a web call center, an instant message, a computer telephony integration (CTI), a unified messaging system (UMS), and diverse applications that are served or to be served.

At present, a VoIP structure is composed of a gateway, a terminal, and a call connection agent. The gateway connects a PSTN with an IP network, so that the networks can communicate with each other, and the call connection agent controls the gateway by using a media gateway control protocol (MGCP). In the VoIP network, H.323 and a session initiation protocol (SIP) are basically used as signaling protocols.

On the other hand, in $3^{rd}$ generation mobile communication systems using International Standard (IS)-95B and 95C, the importance of a data link becomes greater, as diverse services are proposed and used. Among such services, a video call is a technology that enables communication devices to communicate audio and video images with each other, and is expected to be the center of services using mobile communication terminals.

In particular, in an ALL-IP-based mobile communication system, it is expected that more diverse types of video calling services will be possible.

FIG. 1 is an exemplary view illustrating the construction of a conventional video calling system.

As illustrated in FIG. 1, two mobile communication terminals (referred to as terminal A and terminal B) 11 and 12 are connected to each other through a channel 101 for transmitting voice or audio data and a channel 102 for transmitting video data. The voice and video data may be produced through microphones and cameras of the respective mobile communication terminals 11 and 12 and transmitted to each other through the respective channels 101 and 102. In this manner a video call is made through the mobile communication terminals.

Also illustrated is that the respective channels 101, 102 are connected to the terminals 11, 12 through a VoIP network 100.

The conventional video calling system as described above enables a mobile communication terminal 11, for example, to transmit voice data and video data to an opposite mobile communication terminal, i.e., 12, and thus users of the respective mobile communication terminals can exchange audio and video images with each other.

However, the conventional video calling system as described above has a drawback in that its destinations are limited to the respective mobile communication terminals, and thus each user must hold a camera in his/her hand in order to provide a video to the opposite party while he/she is making a video call.

In addition, the conventional video calling system has the problem in that since the display screen of the mobile communication terminal is small, video images of a high picture quality that have been received from the opposite party cannot be displayed on the display screen with the high picture quality maintained.

SUMMARY OF THE INVENTION

Accordingly, the present invention has been designed to solve the above and other problems occurring in the prior art and provides additional advantages, by providing a video calling method capable of providing video to a separate display over a VoIP network, which can transfer IP information of a specified display device to a mobile communication terminal, that provides video data transferred during a video call through the specified display device.

In accordance with one aspect of the present invention, there is provided a video calling method capable of providing video through a display, according to the present invention, which includes a first mobile communication terminal connecting a video calling service with a second mobile communication terminal; the first mobile communication terminal receiving a request to change a device for transmitting/receiving the video to/from the second mobile communication terminal to the display; the first mobile communication terminal transferring information about the display to the second mobile communication terminal, and controlling the second mobile communication terminal to transmit/receive the video to/from the display; and the first mobile communication terminal transferring information about the second mobile communication terminal to the display, and controlling the display to transmit/receive the video to/from the second mobile communication terminal.

In accordance with another aspect of the present invention, there is provided a video calling method capable of providing video through a display, which includes a first mobile communication terminal connecting a video calling service with a second mobile communication terminal, the first mobile communication terminal receiving a request to change a device for transmitting/receiving the video to/from the second mobile communication terminal to the display and the first mobile communication terminal transferring the video from the second mobile communication terminal to the display, and controlling the display to output the video.

BRIEF DESCRIPTION OF THE DRAWINGS

The above features and advantages of the present invention will be more apparent from the following detailed description taken in conjunction with the accompanying drawings, in which.

DETAILED DESCRIPTION

Figure 1:
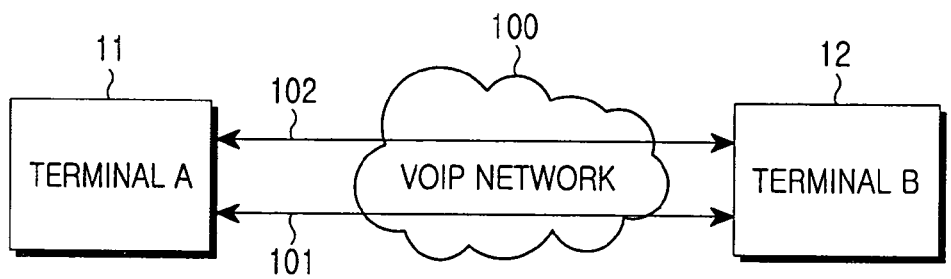
FIG. 1 is an exemplary view illustrating the construction of a conventional video calling system.

Embodiments of the present invention will be described in detail hereinafter with reference to the accompanying drawings. In the following description of the present invention, the same drawing reference numerals are used for the same elements, even when in different drawings. For the purposes of clarity and simplicity, a detailed description of known functions and configurations incorporated herein will be omitted as it may obscure the subject matter of the present invention. Although a number of specific features such as detailed constituent elements are given in the following description of the present invention, they are presented for a better understanding of the present invention only. Also, it will be clear to those skilled in the art that such specific features can easily be changed or modified within the scope of the present invention.

Figure 2A:
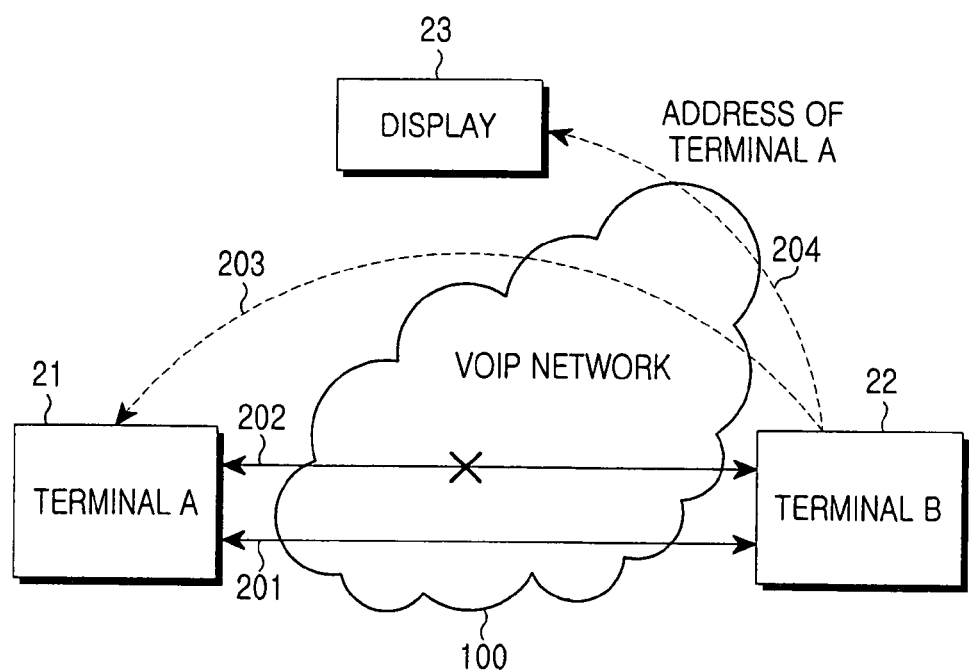
FIGS. 2A and 2B are exemplary views illustrating the construction of a VoIP video calling system to which a video calling method capable of providing video through a display is applied according to an embodiment of the present invention.
Figure 2B:
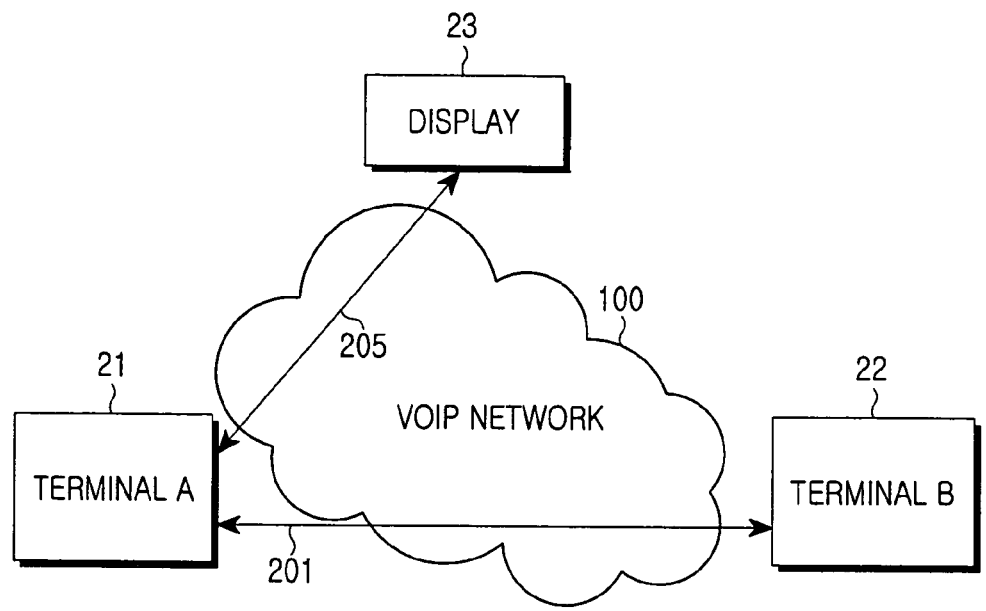

FIGS. 2A and 2B are exemplary views illustrating the construction of a VoIP video calling system to which a video calling method capable of providing video through a display is applied according to an embodiment of the present invention.

Here, FIG. 2A exemplifies a setting operation for a video calling method capable of providing video through a display according to the present invention.

As shown in FIG. 2A, according to the video calling method capable of providing video through a display according to the present invention, two mobile communication terminals (terminal A and terminal B) 21 and 22 are connected to each other through a channel 201 for transmitting voice data and a channel 202 for transmitting video data. The voice data and video data may be produced through microphones and cameras of the respective mobile communication terminals (terminal A and terminal B) 21 and 22. The voice and video data may be transmitted through the respective channels 201 and 202, so that a video call is made through the mobile communication terminals. In this case, it is exemplified that the respective channels are connected to the terminals through a VoIP network 100.

If the mobile communication terminal B 22 intends to receive the transmitted video through a separate display 23 such as a television receiver (TV), the IP address of the display 23 is transferred to the mobile communication terminal A 21, the channel for the video data transmission 202 is terminated, and the construction of a new channel 203 is made for the video data transmission to the corresponding display 23.

In addition, the mobile communication terminal B 22 transfers the IP address of the mobile communication terminal A 21 to the display 23 (204), so that the display 23 can confirm the source address when the new channel for the video data transmission is constructed.

FIG. 2B exemplifies a case where a new channel 205 for the video data transmission is constructed by the setting operation illustrated in FIG. 2A.

In summary, the channel 201 for the voice data transmission between the two mobile communication terminals A 21 and B 22 is maintained, the channel 202 for the video data transmission is terminated (see FIG. 2A), and a new channel 205 for the video data transmission between the mobile communication terminal A 21 and the display 23 is constructed.

Here, the mobile communication terminal A 21 transfers the voice data to the mobile communication terminal B 22 through the channel 201, and transfers the video data to the display 23 through the channel 205.

As described above, the video calling method capable of providing video through a separate display according to the present invention requires that the display has the IP address. In other words, if the display 23 does not have the IP address, the mobile communication terminal A 21 cannot find the destination to which the mobile communication terminal will transfer the video data.

Through the construction as illustrated in FIGS. 2A and 2B, the user of the mobile communication terminal B 22 can make a phone call to the mobile communication terminal A 21 as he/she views the image of the other party through the display 23 such as a TV, a computer monitor, an LCD display, etc.

Here, the display 23 may be any display device having its own IP address. Since the display device can receive and output diverse formats of video data, it can output the video data transferred from the opposite party without loss even if the transferred video data is a high resolution video data.

Figure 3:
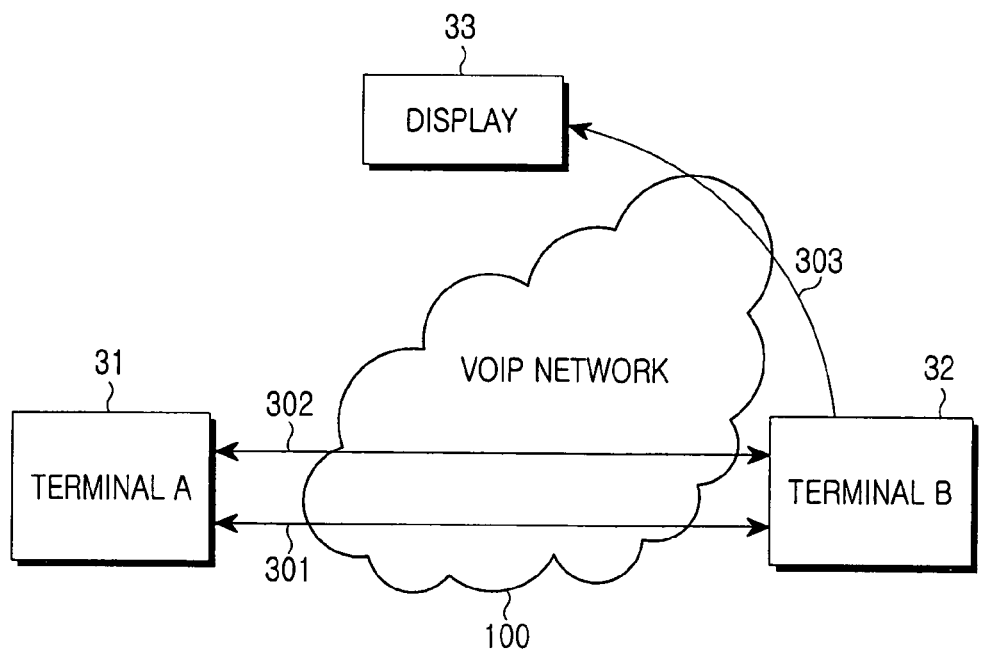
FIG. 3 is a view illustrating the construction of a VoIP video calling system to which a video calling method capable of providing video through a display is applied according to another embodiment of the present invention.

FIG. 3 is a view illustrating the construction of a VoIP video calling system to which a video calling method capable of providing video through a separate display is applied according to another embodiment of the present invention.

As illustrated in FIG. 3, according to the VoIP video calling system to which the video calling method according to the present invention is applied, the existing connection for a video call is not terminated, and the transmission of the video data to the display 33 is performed by the mobile communication terminal B 32.

That is, two mobile communication terminals (terminal A and terminal B) 31 and 32 are connected to each other through a channel 301 for transmitting voice data and a channel 302 for transmitting video data, and transmit voice data and video data produced through microphones and cameras of the respective mobile communication terminals A 31 and B 32 to each other through the respective channels 301 and 302, so that a video call is made between the mobile communication terminals.

The mobile communication terminal B 32 transfers the video data received from the mobile communication terminal A 31 to the display 33 to display the video data on display 33. As illustrated, the respective channels 301, 302 are connected to the terminals through VoIP network 100.

Although it is exemplified that the channel for transferring the video data between the mobile communication terminal B 32 and the display 33 is connected through VoIP network 100, it is also possible to connect the channel through diverse short distance communication systems such as Bluetooth, ZigBee, wireless LAN, and others.

Figure 4:
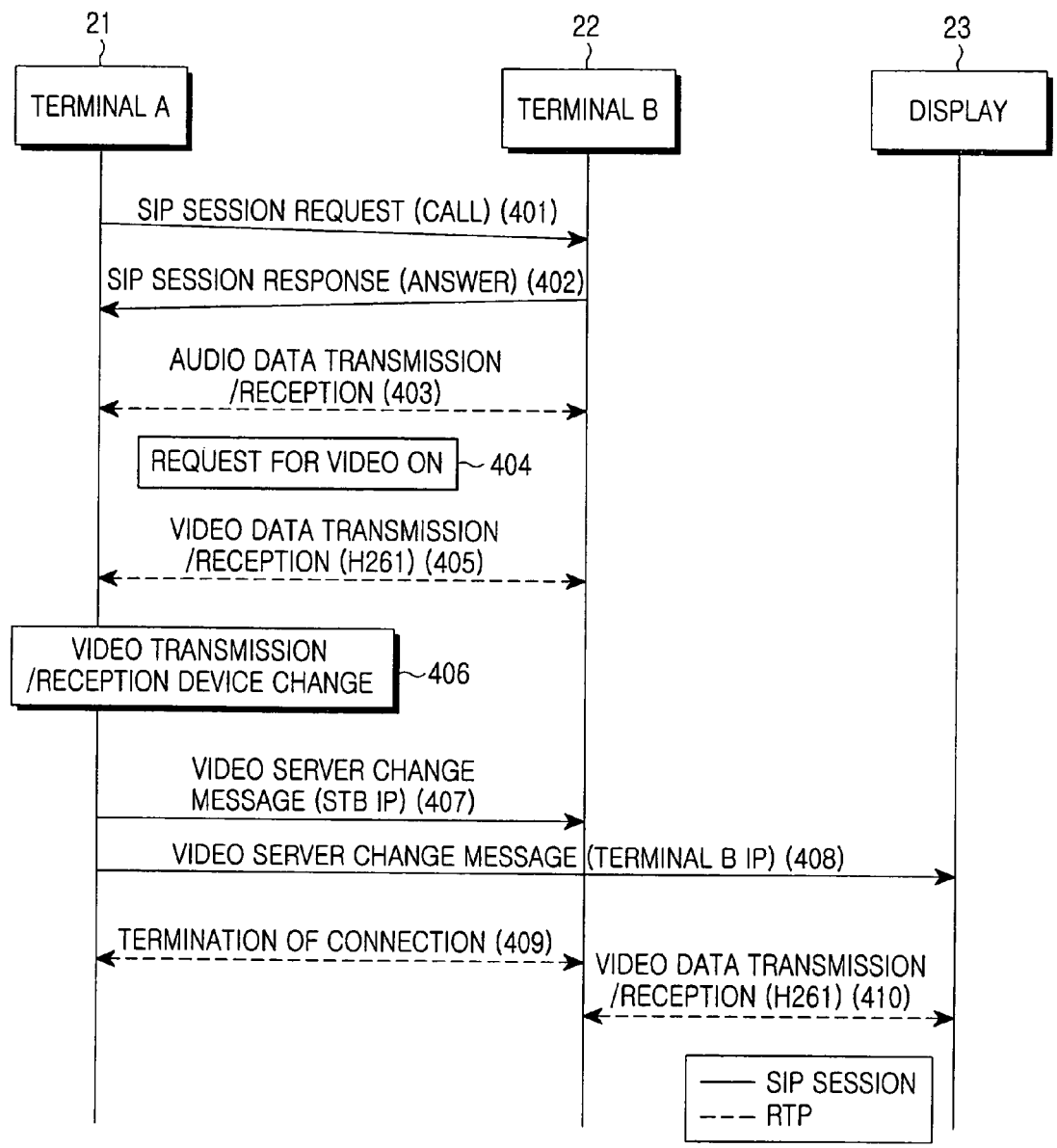
FIG. 4 is a timing diagram explaining a video calling method capable of providing video through a display according to an embodiment of the present invention.

FIG. 4 is a timing diagram explaining a video calling method capable of providing video through a separate display according to an embodiment of the present invention.

FIG. 4 exemplifies a video calling method capable of providing video through a separate display according to the present invention, which is implemented in the process shown of FIGS. 2A and 2B.

If the mobile communication terminal A 21 and the mobile communication terminal B 22 establish a video calling service session by a session initiation protocol (SIP) based on a user datagram protocol (UDP) represented as sequence lines 401 and 402, the terminals transmit/receive audio data in real time through a real-time transport protocol (RTP) to achieve a voice calling service represented as sequence line 403.

When "VIDEO ON" is requested (404) through video calling programs of the mobile communication terminal A 21 and the mobile communication terminal B 22, the terminals receive video data from device drivers of cameras (405) attached to the respective mobile communication terminals 21 and 22, and transmit/receive the video data by using H.261 as codecs, for example.

In order to provide the video through to a separate display, the mobile communication terminal A 21 receives a command (406) for changing a video transmission/reception device from the user, and transfers a video server change message (407) that includes the IP address of display 23 to the mobile communication terminal B 22. Also, the mobile communication terminal A 21 transfers the video server change message (408) that includes the IP address of the mobile communication terminal B 22 to be changed by the mobile communication terminal A 21 to display 23.

In this case, the channel connection for transmitting the video data between the mobile communication terminal A 21 and the mobile communication terminal B 22 is terminated (409), and a video data transmission/reception channel is constructed between the mobile communication terminal B 22 and the display 23 to transmit/receive the video data (410). At this time, the voice data transmission/reception is still performed between the mobile communication terminal A 21 and the mobile communication terminal B 22.

In the embodiment of the present invention, it is exemplified that the display receives and displays the video data. However, in the case where a video device such as a camera is mounted on the corresponding display, the display may provide video data obtained through the video device to the opposite mobile communication terminal.

As described above, according to the present invention, video data transferred for a video call is provided through a specified display device, and thus the user's convenience can be increased.

In addition, according to the present invention, since the video can be provided through another display device, the output of video data of a high picture quality is possible.

The method according to the present invention as described above may be implemented by a program and stored in a recording medium (such as a CD-ROM, RAM, floppy disk, hard disk, optomagnetic disk, and others) in a computer-readable form or may be downloaded through a network.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A video calling method for providing video through a separate display unit, the method comprising the steps of:
   connecting a video calling service providing video communication and voice/audio communication between a first mobile communication terminal and a second mobile communication terminal;
   receiving, at the first mobile communication terminal, a request to change a device for transmitting/receiving a video associated with the video calling service to/from the second mobile communication terminal to the separate display unit while continuing to retain a voice/audio channel connected between the first mobile communication terminal and the second mobile communication terminal;
   transferring, by the first mobile communication terminal, information about the separate display unit to the second mobile communication terminal, and controlling the second mobile communication terminal to transmit/receive the video to/from the separate display unit; and
   transferring, by the first mobile communication terminal, information about the second mobile communication terminal to the separate display unit, and controlling the separate display unit to transmit/receive the video to/from the second mobile communication terminal, wherein the second mobile communication terminal provides voice/audio communication for a user of the second mobile communication terminal with the first mobile communication terminal, and the separate display unit provides the video communication between the user of the second communication terminal and the first communication terminal, wherein the user of the second communication terminal communicates via voice/audio with the first communication terminal using the second communication terminal while substituting the separate display for video communication associated with the voice/audio communication instead of using the second communication terminal for said video communication associated with the voice/audio communication.

2. The video calling method as claimed in claim 1, wherein the step of connecting further comprises the steps of:
   establishing a video calling service session between the first mobile communication terminal and the second communication terminal by a session initiation protocol (SIP) based on a user datagram protocol (UDP);
   performing the voice calling service by transmitting/receiving audio data in real time through a real-time transport protocol (RTP), depending on the setting of the video calling service; and
   connecting the video calling service between the first mobile communication terminal and the second communication terminal by requesting to provide the video through a video calling program and transmitting/receiving video data to/from the respective mobile communication terminals.

3. The video calling method as claimed in claim 1, wherein the information about the separate display unit comprises an Internet protocol (IP) address of the separate display unit.

4. The video calling method as claimed in claim 1, wherein the information about the second mobile communication terminal is an Internet protocol (IP) address of the second mobile communication terminal.

5. The video calling method as claimed in claim 1, wherein the first mobile communication terminal, the second mobile communication terminal, and the separate display unit are connected through a voice over IP (VoIP) network.

6. A video calling method for providing video through a separate display unit, the method comprising the steps of:
   connecting a video calling service providing video communication and voice/audio communication between a first mobile communication terminal and a second mobile communication terminal;
   receiving at the first mobile communication terminal a request to change a device for transmitting/receiving a video associated with the video calling service b/from the second mobile communication terminal to the separate display unit;
   outputting, at the first mobile communication terminal, a voice/audio associated with the video calling service and received from the second mobile communication terminal and transferring, by the first mobile communication terminal, the video from the second mobile communication terminal to the separate display unit, and controlling the separate display unit to output the video, wherein the first mobile communication terminal provides voice/audio communication for a user of the first mobile communication terminal with the second mobile communication terminal, and the separate display unit provides the video to/from the user of the first communication terminal and the second communication terminal, wherein the user of the first communication terminal communicates via voice/audio with the second communication terminal using the first communication terminal while substituting the separate display for video communication associated with the voice/audio communication instead of using the first communication terminal for said video communication associated with the voice/audio communication.

7. The video calling method as claimed in claim 6, wherein the first mobile communication terminal and the display are connected through a short-distance communication link.

8. An apparatus, resident in a first mobile communication terminal, for providing a video calling method for providing video through a separate display unit, the apparatus comprising:
   a processor in communication with a memory, the processor executing code for:
   connecting a video calling service providing video communication and audio communication between the first mobile communication terminal and a second mobile communication terminal;
   receiving a request to change a device for transmitting/receiving the video communication to/from the second mobile communication terminal to the separate display unit;
   transferring information about the separate display unit to the second mobile communication terminal, and controlling the second mobile communication terminal to transmit/receive a video associated with the video calling service to/from the separate display unit; and
   transferring information about the second mobile communication terminal to the separate display unit, and controlling the separate display unit to transmit/receive the video to/from the second mobile communication terminal, wherein the second mobile communication terminal provides voice/audio communication for a user of the second mobile communication terminal with the first mobile communication terminal, and the separate display unit provides the video communication between the user of the second communication terminal and the first communication terminal, wherein the user of the second communication terminal communicates via voice/audio with the first communication terminal using the second communication terminal while substituting the separate display for video communication associated with the voice/audio communication instead of using the second communication terminal for said video communication associated with the voice/audio communication.

9. The apparatus as claimed in claim 8, wherein in connecting to video service the processor executes code for:
   establishing a video calling service session to the second communication terminal by a session initiation protocol (SIP) based on a user datagram protocol (UDP);
   performing the voice calling service by transmitting/receiving audio data in real time through a real-time transport protocol (RTP), depending on the setting of the video calling service; and
   connecting the video calling service to the second communication terminal by requesting to provide the video through a video calling program and transmitting/receiving video data to/from the respective mobile communication terminals.

10. The apparatus as claimed in claim 8, wherein the information about the separate display unit comprises an Internet protocol (IP) address of the separate display unit.

11. The apparatus as claimed in claim 8, wherein the information about the second mobile communication terminal is an Internet protocol (IP) address of the second mobile communication terminal.

12. The apparatus as claimed in claim 8, wherein the first mobile communication terminal, the second mobile communication terminal, and the separate display unit are connected through a Voice over IF (VoIP) network.

13. A computer implemented method comprising machine readable executable code implemented within a memory of a first mobile communication terminal, said method instructing a processor to execute the steps of:
   connecting a video calling service providing video communication and audio communication between the first mobile communication terminal and a second mobile communication terminal;
   receiving a request to change a device for transmitting/receiving a video associated with the video calling service to/from the second mobile communication terminal to the separate display unit;
   transferring information about the separate display unit to the second mobile communication terminal, and controlling the second mobile communication terminal to transmit/receive the video to/from the separate display unit; and
   transferring information about the second mobile communication terminal to the separate display unit, and controlling the separate display unit to transmit/receive the video to/from the second mobile communication terminal,
   wherein the second mobile communication terminal provides voice/audio communication for a user of the second mobile communication terminal with the first mobile communication terminal, and the separate display unit provides the video communication between the user of the second communication terminal and the first communication terminal, wherein the user of the second communication terminal communicates via voice/audio with the first communication terminal using the second communication terminal while substituting the separate display for video communication associated with the voice/audio communication instead of using the second communication terminal for said video communication associated with the voice/audio communication.

14. The computer implemented method as claimed in claim 13, wherein in connecting the video service includes:
   establishing a video calling service session to the second communication terminal by a session initiation protocol (SIP) based on a user datagram protocol (UDP);
   performing the voice calling service by transmitting/receiving audio data in real time through a real-time transport protocol (RIP), depending on the setting of the video calling service; and
   connecting the video calling service between the second communication terminal by requesting to provide the video through a video calling program and transmitting/receiving video data to/from the respective mobile communication terminals.

15. The computer implemented method as claimed in claim 13, wherein the information about the separate display unit comprises an Internet protocol (IP) address of the separate display unit.

16. The computer implemented method as claimed in claim 13, wherein the information about the second mobile communication terminal is an Internet protocol (IP) address of the second mobile communication terminal.

17. The computer implemented method as claimed in claim 13, wherein the first mobile communication terminal, the second mobile communication terminal, and the separate display unit are connected through a Voice over IP (VoIP) network.

* * * * *